United States Patent

Haecker et al.

[11] Patent Number: 6,113,364
[45] Date of Patent: Sep. 5, 2000

[54] PUMP UNIT FOR A SLIP-CONTROLLED, HYDRAULIC BRAKE SYSTEM OF MOTOR VEHICLES

[75] Inventors: Juergen Haecker, Markgroeningen; Harald Ott, Leonberg, both of Germany

[73] Assignee: Robert Bosch GmbH, Stuttgart, Germany

[21] Appl. No.: 09/048,274

[22] Filed: Mar. 26, 1998

[30] Foreign Application Priority Data

Mar. 26, 1997 [DE] Germany .......................... 197 12 686

[51] Int. Cl.$^7$ ...................................................... F04B 53/04
[52] U.S. Cl. ................................................. 417/434; 92/82
[58] Field of Search .................................. 417/434; 92/86

[56] References Cited

U.S. PATENT DOCUMENTS 5,569,025 10/1996 Bendel et al. ......................... 417/434

FOREIGN PATENT DOCUMENTS 42 39 361 A1 5/1994 Germany .

Primary Examiner—Tony M. Argenbright
Assistant Examiner—Arnold Castro
Attorney, Agent, or Firm—Edwin E. Greigg; Ronald E. Greigg

[57] ABSTRACT

A pump housing, including a pump unit having a collection chamber that receives leaking brake fluid. In the installed position of the pump unit, an outflow bore leads downward from the collection chamber to the ambient air. A body which in one direction allows the outflow of leaking brake fluid and in another direction prevents the entry of splashing water and standing water is press-fitted into the outflow bore. The body comprises a porous sintered metal and on the ambient air side has a flat face end, while its face end toward the collection chamber is embodied in raised fashion.

4 Claims, 1 Drawing Sheet

6,113,364

PUMP UNIT FOR A SLIP-CONTROLLED, HYDRAULIC BRAKE SYSTEM OF MOTOR VEHICLES

BACKGROUND OF THE INVENTION

The invention is based on a pump unit as defined hereinafter.

One such pump unit is already known (DE 42 39 361 A1), in which a body press-fitted into an outflow bore is provided with axially parallel openings that discharge into a seat valve. This valve has a disk-shaped rubber plate, which is received on the body and cooperates with a valve seat formed on the body. The seat valve is intended to open toward the ambient air and be permeable to leaking brake fluid but to prevent the entry of splashing water into the outflow bore.

The body that has the seat valve indeed comprises only two components and is simple to mount. Nevertheless, the valve is not failsafe, since a foreign body can impair its closing function. Moreover, the valve seems to be disproportionately large, since under normal wear conditions leaking brake fluid does not occur in great quantities in the pump unit.

OBJECT AND SUMMARY OF THE INVENTION

The pump unit according to the invention has the advantage over the prior art that the desired function of the body is attained on the basis of its structure, and its shaping promotes assembly and long-term effectiveness: assembly is made easier, because the raised face end makes the association with the collection chamber clearly apparent, or in other words is helpful in positionally correctly inserting the body into the outflow bore; long-term effectiveness is improved because on the one hand the raised face end increases the effective surface area on the body and on the other foreign bodies entrained with the leaking fluid are carried from the collection chamber to the trailing edge of the face end.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
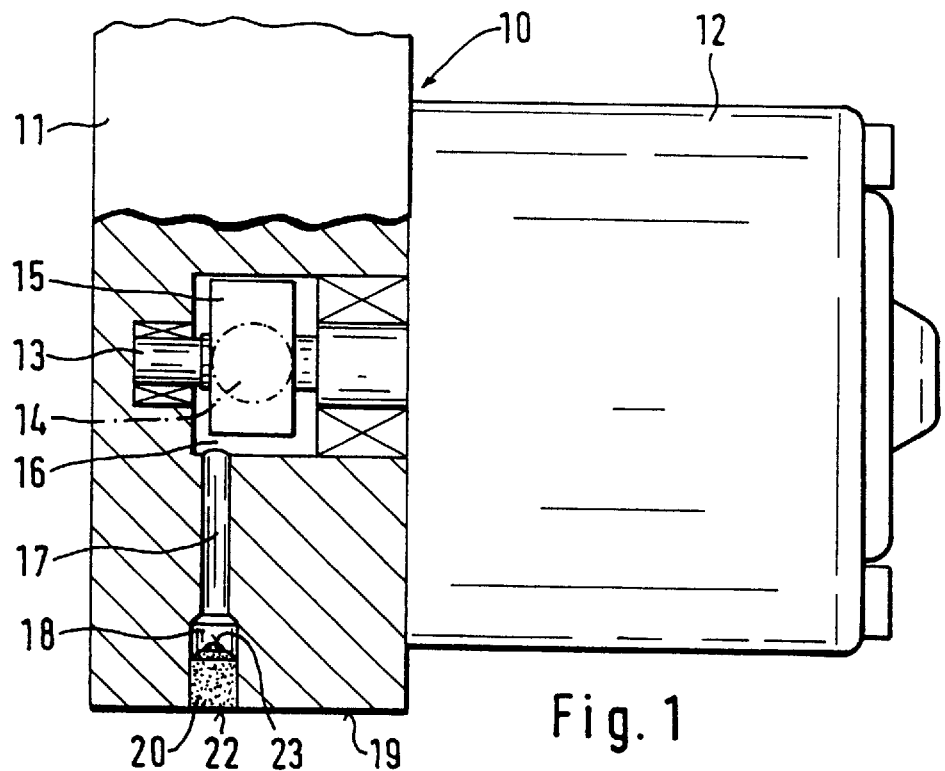
FIG. 1 shows a pump unit, partly cut away, with a body in an outflow bore.

A pump unit 10 shown in FIG. 1 for a slip-controlled hydraulic brake system of motor vehicles has a pump housing 11 with an electric motor 12 mounted on it. This motor is supported by a drive shaft 13 in the pump housing 11. Also received in the pump housing 11 are two pump elements, not visible in the drawing, which extend in front of and behind the plane of the drawing with an axis perpendicular to it. In FIG. 1, only the outline of one pump piston 14 of the pump elements is indicated by a dot-dashed line. Cooperating with the pump pistons 14 is an eccentric 15, which is disposed on the drive shaft 13 and is received in a recess of the pump housing 11, the recess hereinafter being called the collection chamber 16.

In operation of the electric motor 12, leakage can occur at the seals cooperating with the pump pistons 14. This leakage can have two causes: slow leakage in normal operation of the pump and/or leakage caused by increasing wear at the seals. This leakage escaping from the pump elements can reach the collection chamber 16 of the pump housing 11. To prevent the leaking brake fluid from entering the electric motor 12, an outflow bore 17 leading to the ambient air is provided in the pump housing 11. This outflow bore 17, when the pump unit 10 is in its installed position in the vehicle (as is shown in FIG. 1), extends from the lowermost region of the collection chamber 16 vertically downward and discharges with a portion 18 of enlarged diameter at an outer face 19 located on the bottom of the pump housing 11. A cylindrical body 20 of a sintered metal, such as stainless steel, is press-fitted into this portion 18 of the outflow bore 17. The porous sintered metal body 20 allows the throttled, long-term passage of leaking brake fluid through to the outside, but prevents the entry of water into the pump housing 11, if the pump unit 10 is briefly acted upon by splashing water or dips briefly into water.

Figure 2:
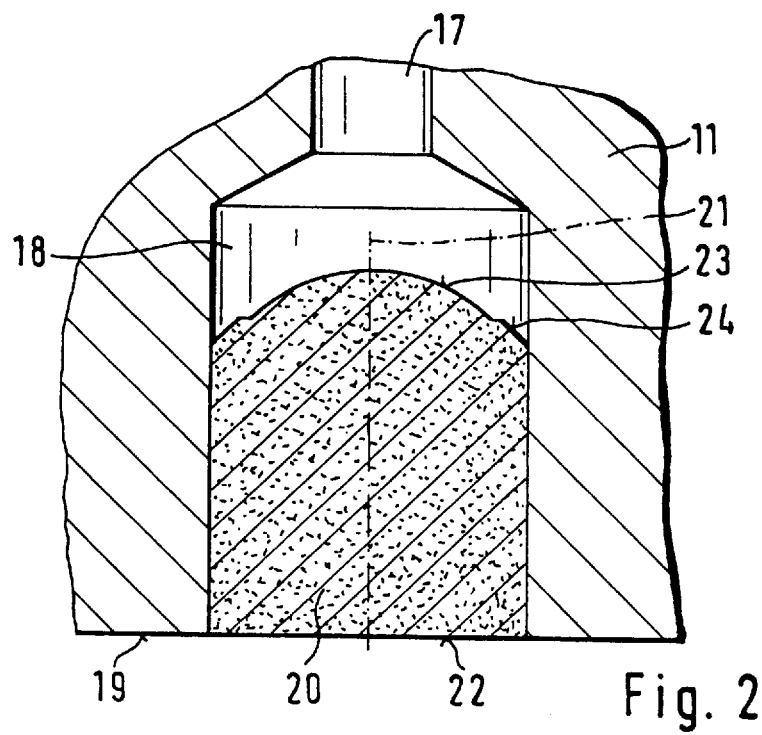
FIG. 2 shows the body in section on a larger scale than in FIG. 1.

The sintered metal body 20 is a rotationally symmetrically component (FIG. 2). On the ambient air side, it has a flat face end 22 extending perpendicular to its longitudinal axis 21. This end is embodied for the engagement of a press ram, not shown, with which the sintered metal body 20 is press-fitted into the portion 18 of the outflow bore 17 until the press ram strikes the outer face 19 of the pump housing 11. The flat face end 22 enables good contact with the press ram and prevents tilting of the body 20 during the joining process. The opposed face end 23, on the side toward the collection chamber, of the sintered metal body 20 is conversely embodied in raised fashion, for instance with a dome-shaped end face. Unlike the exemplary embodiment, however, the face end 23 may also be embodied as a conical, cylindrical, or pyramidal protrusion. By means of this shaping, the surface area of the sintered metal body 20 that is definitive for the entry of leaking brake fluid is increased. Toward the edge, the sintered metal body 20 is provided on the face end 23 with a chamfer 24, with which the insertion of the sintered metal body into the bore portion 18 during the press-fitting operation is facilitated. Moreover, foreign bodies entrained with the leaking brake fluid, such as seal abrasion, can be deposited in the region of the chamfer 24, without substantially reducing the effective surface area of the sintered metal body 20.

The foregoing relates to a preferred exemplary embodiment of the invention, it being understood that other variants and embodiments thereof are possible within the spirit and scope of the invention, the latter being defined by the appended claims.

We claim:

1. A pump unit (10) for a slip-controlled hydraulic brake system of motor vehicles, comprising a pump housing (11), a collection chamber (16) in the pump housing (11) that receives leaking brake fluid, an outflow bore (17, 18) that in an installed position of the pump unit (10) leads downward from the collection chamber (16) to an outside ambient air, a cylindrical body (20) that is press-fitted into the outflow bore (17, 18), said cylindrical body in one direction allows the outflow of leaking brake fluid and in another direction prevents the entry of splashing water and standing water, the body (20) comprises a porous sintered metal and is embodied as raised on a face end (23) toward the collection chamber.

2. A pump unit in accordance with claim 1, in which the face end (23) of the body (20) toward the collection chamber is embodied as a dome-shaped, conical, cylindrical or a pyramidal protrusion.

3. A pump unit in accordance with claim 1, in which the body (20) is chamfered on a side toward the collection chamber.

4. A pump unit in accordance with claim 1, in which the body on the ambient air side has a flat face end (22), that extends perpendicular to a longitudinal axis (21) of the body (20).

* * * * *